(12) United States Patent
Chiou et al.

(10) Patent No.: US 9,585,181 B2
(45) Date of Patent: Feb. 28, 2017

(54) METHOD FOR FINDING WIRELESS DEVICE BY WI-FI DIRECT

(71) Applicant: MEDIATEK INC., Hsin-Chu (TW)

(72) Inventors: Kuo-Pin Chiou, Hsinchu (TW); Shiuan-Wen Chen, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/683,138

(22) Filed: Apr. 9, 2015

(65) Prior Publication Data

US 2015/0327006 A1 Nov. 12, 2015

Related U.S. Application Data

(60) Provisional application No. 61/990,714, filed on May 9, 2014, provisional application No. 62/009,506, filed on Jun. 9, 2014.

(51) Int. Cl.
| | | |
|---|---|---|
| *H04W 24/00* | (2009.01) | |
| *H04W 76/02* | (2009.01) | |
| *H04W 4/02* | (2009.01) | |
| *H04W 4/00* | (2009.01) | |
| *H04W 84/12* | (2009.01) | |

(52) U.S. Cl.
CPC .......... *H04W 76/023* (2013.01); *H04W 4/008* (2013.01); *H04W 4/02* (2013.01); *H04W 76/02* (2013.01); *H04W 4/023* (2013.01); *H04W 84/12* (2013.01)

(58) Field of Classification Search
CPC ........ H04W 4/02; H04W 4/008; H04W 76/02; H04W 4/023; H04W 76/023; H04W 84/12
USPC ................ 455/404.2, 412.1–414.2, 418–422.1, 455/41.1–41.2, 456.1, 456.2, 456.3, 552.1; 340/539.32, 572.1, 539.13, 539.11, 539.1, 340/539.21, 568.1, 568.5–568.7, 686.1, 686.6
See application file for complete search history.

(56) References Cited

U.S. PATENT DOCUMENTS

| | | | | |
|---|---|---|---|---|
| 7,034,684 | B2 * | 4/2006 | Boman ............... | G08B 13/1427 340/539.11 |
| 7,420,465 | B2 * | 9/2008 | Ritter ..................... | G06Q 20/32 340/539.32 |
| 7,898,414 | B2 * | 3/2011 | Spano ................... | G08B 21/24 340/539.13 |
| 8,508,363 | B2 * | 8/2013 | Raniere ................. | G08B 13/14 340/539.32 |
| 2005/0068168 | A1 * | 3/2005 | Aupperle ........... | G08B 13/1427 340/539.13 |
| 2005/0285739 | A1 * | 12/2005 | Velhal ................ | G08B 21/0227 340/572.1 |
| 2008/0056215 | A1 * | 3/2008 | Kopikare .............. | H04W 8/005 370/338 |
| 2009/0318197 | A1 * | 12/2009 | Ron ................... | H04M 1/72572 455/567 |
| 2010/0159833 | A1 * | 6/2010 | Lewis .................... | H04B 17/23 455/41.3 |
| 2011/0084807 | A1 * | 4/2011 | Logan ..................... | H04Q 9/00 340/10.1 |

(Continued)

*Primary Examiner* — Babar Sarwar
(74) *Attorney, Agent, or Firm* — Winston Hsu; Scott Margo

(57) ABSTRACT

The present invention provides a method for finding a wireless device. The exemplary method comprises: storing a Wi-Fi direct connection profile between the wireless device and an electronic device; enabling the Wi-Fi direct function of the wireless device when a condition is met; and establishing a Wi-Fi direct connection with the wireless device in the electronic device to control the wireless device.

13 Claims, 3 Drawing Sheets

(56) References Cited

U.S. PATENT DOCUMENTS

2013/0260784 A1\* 10/2013 Lutz ................. H04M 1/72572
                                                      455/456.1
2015/0220290 A1\* 8/2015 Park ..................... G06F 3/1296
                                                      358/1.13
2015/0282229 A1\* 10/2015 Vedula ................ H04W 76/023
                                                      370/338

\* cited by examiner

METHOD FOR FINDING WIRELESS DEVICE BY WI-FI DIRECT

CROSS REFERENCE TO RELATED APPLICATIONS

This application claims the benefit of U.S. Provisional Application No. 61/990,714 filed on May 9, 2014 and U.S. Provisional Application No. 62/009,506 filed on Jun. 9, 2014 and included herein by reference.

BACKGROUND

In general, when a smartphone is in a mute mode or a vibration mode, and the owner of the smartphone forgets where the smartphone is or the smartphone is lost, it is very difficult to find the smartphone in a short time since the smartphone does not generate any sound even the user makes a phone call to the smartphone.

A conventional method for finding the smartphone under the above condition is based on a Bluetooth technology. However, the conventional method requires an additional device in or with the smartphone, such as a BLE (Bluetooth Low Energy) tag, and the additional device can be costly for ordinary users. In addition, the conventional method can only be used in a one-way operation rather than a bi-directional operation. For example, the conventional method can only use a BLE tag to find the smartphone, but the conventional method is not capable of using the smartphone to find the BLE tag.

SUMMARY

The disclosed embodiments of the present invention is related to a method to find a first wireless device, and more particularly, to a method to find a first wireless device by utilizing a Wi-Fi direct function between the first wireless device and a second wireless device without using any additional hardware.

In accordance with exemplary embodiments of the present invention, a method for finding a wireless device by utilizing a Wi-Fi direct connection between the first wireless device and a second wireless device without using any additional hardware even when the first electronic device is in a mute mode or a vibration mode is proposed to solve the above-mentioned problem.

According to a first aspect of the present invention, an exemplary method for finding a wireless device is disclosed. The exemplary method comprises: storing a Wi-Fi direct connection profile between the wireless device and an electronic device; enabling the Wi-Fi direct function of the wireless device when a condition is met; and establishing a Wi-Fi direct connection with the wireless device in the electronic device to control the wireless device.

Briefly summarized, the method disclosed by the present invention can help a user to find the first electronic device by utilizing a Wi-Fi direct connection between the first wireless device and a second wireless device without using any additional hardware even when the first electronic device is in a mute mode or a vibration mode, and thus the present invention can reduce hardware cost.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The key idea of the present invention is to utilize a Wi-Fi direct connection between a first wireless device (such as a smartphone, a tablet, a laptop, or a handheld computing device) and a second wireless device (such as a smartphone, a tablet, a laptop, or a handheld computing device) to find the first wireless device without using any additional hardware even when the first wireless device is in a mute mode or a vibration mode. Further details of the proposed constellation phase rotation scheme are described as below.

Figure 1:
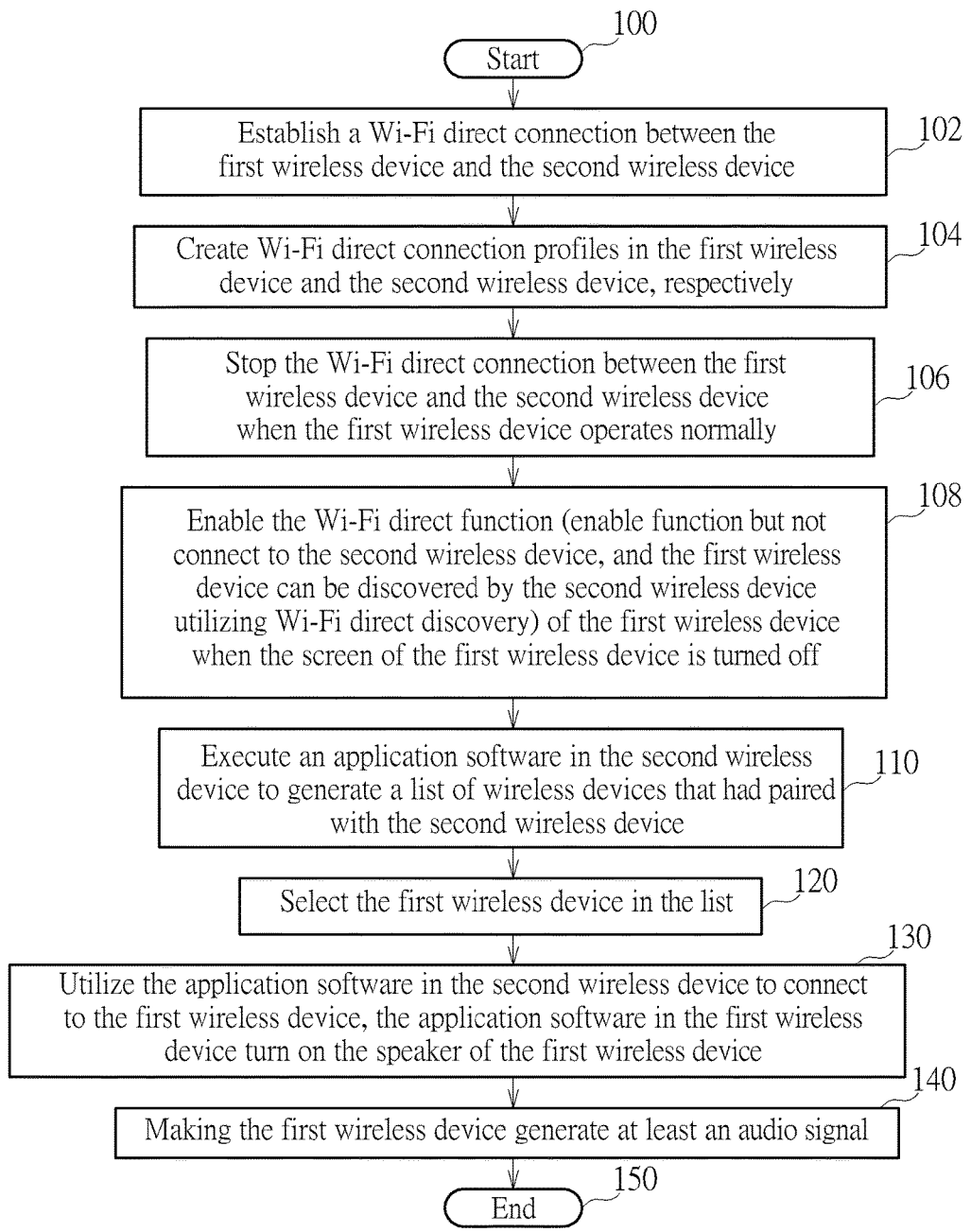
FIG. 1 is a flowchart showing a method for finding a first wireless device by utilizing a Wi-Fi direct connection between the first wireless device and a second wireless device in accordance with a first exemplary embodiment of the present invention.

Please refer to FIG. 1. FIG. 1 is a flowchart showing a method for finding a first wireless device by utilizing a Wi-Fi direct connection between the first wireless device and a second wireless device in accordance with a first exemplary embodiment of the present invention, wherein the first wireless device can be a smartphone, a tablet, a laptop, or a handheld computing device, and the second wireless device also can be a smartphone, a tablet, a laptop, or a handheld computing device. Provided that the result is substantially the same, the steps in FIG. 1 are not required to be executed in the exact order shown in FIG. 1. The method of the first exemplary embodiment in the present invention comprises the following steps:

Step 100: Start.

Step 102: Establish a Wi-Fi direct connection between the first wireless device and the second wireless device.

Step 104: Create Wi-Fi direct connection profiles in the first wireless device and the second wireless device, respectively.

Step 106: Stop the Wi-Fi direct connection between the first wireless device and the second wireless device when the first wireless device operates normally.

Step 108: Enable the Wi-Fi direct function (enable function but not connect to the second wireless device, and the first wireless device can be discovered by the second wireless device utilizing Wi-Fi direct discovery) of the first wireless device when the screen of the first wireless device is turned off.

Step 110: Execute an application software in the second wireless device to generate a list of wireless devices that had paired with the second wireless device.

Step 120: Select the first wireless device in the list.

Step 130: Utilize the application software in the second wireless device to connect to the first wireless device, the application software in the first wireless device turn on the speaker of the first wireless device.

Step 140: Making the first wireless device generate at least an audio signal.

Step 150: End.

(Wi-Fi direct connection needs to be established for the $1^{st}$ time, and the connection can be established manually or trigger by NFC and connect automatically) The Wi-Fi direct connection profiles in the first wireless device and the second wireless device can be automatically created respectively. Next, in the Step 106, when the first wireless device operates normally (i.e. the first wireless device is not lost by the user), the Wi-Fi direct connection between the first wireless device and the second wireless device can be automatically stopped. Next, in the Step 108, when the screen of the first wireless device is turned off (i.e. the first wireless device is in a power saving mode, a sleep mode, or lost by the user) the Wi-Fi direct function in the first wireless device wireless can be automatically enabled. Next, in the Step 110, when the user can not find the first wireless device or the first wireless device is lost, the user can execute an application software in the second wireless device (such as a windows application program in a PC or a laptop, or an APP program in a smartphone or a tablet, etc.) to generate a list of wireless devices that had paired with the second wireless device. Next, in the Step 120, the user can select the first wireless device in the list by using the second wireless device. Next, in the Step 130, the user can utilize the application software in the second wireless device (such as a windows application program in a PC or a laptop, or an APP program in a smartphone or a tablet, etc.) to connect to the first wireless device and then the application software in the $1^{st}$ device turn on the speaker of the first wireless device. Next, in the Step 140, the user can make the first wireless device generate at least an audio signal. For example, the user can utilize the application software in the second wireless device to connect to the first wireless device to make the first wireless device generate a sound, a song, or music constantly or discontinuously. Or, if the first wireless device is a smartphone, and then the user can make a phone call to the first wireless device to make the first wireless device generate at least an audio signal (such as a sound, a song, or music). In this way, the method disclosed by the present invention can help the user to find the first wireless device by utilizing the Wi-Fi direct connection between the first wireless device and the second wireless device without using any additional hardware even when the first wireless device is in the mute mode or the vibration mode.

Please note that the above embodiment is only for an illustrative purpose and is not meant to be a limitation of the present invention. For example, the step of enabling the Wi-Fi direct function of the first wireless device when a screen of the first wireless device is turned off can further comprise: switching the first wireless device to a mute mode or a vibration mode.

Figure 2:
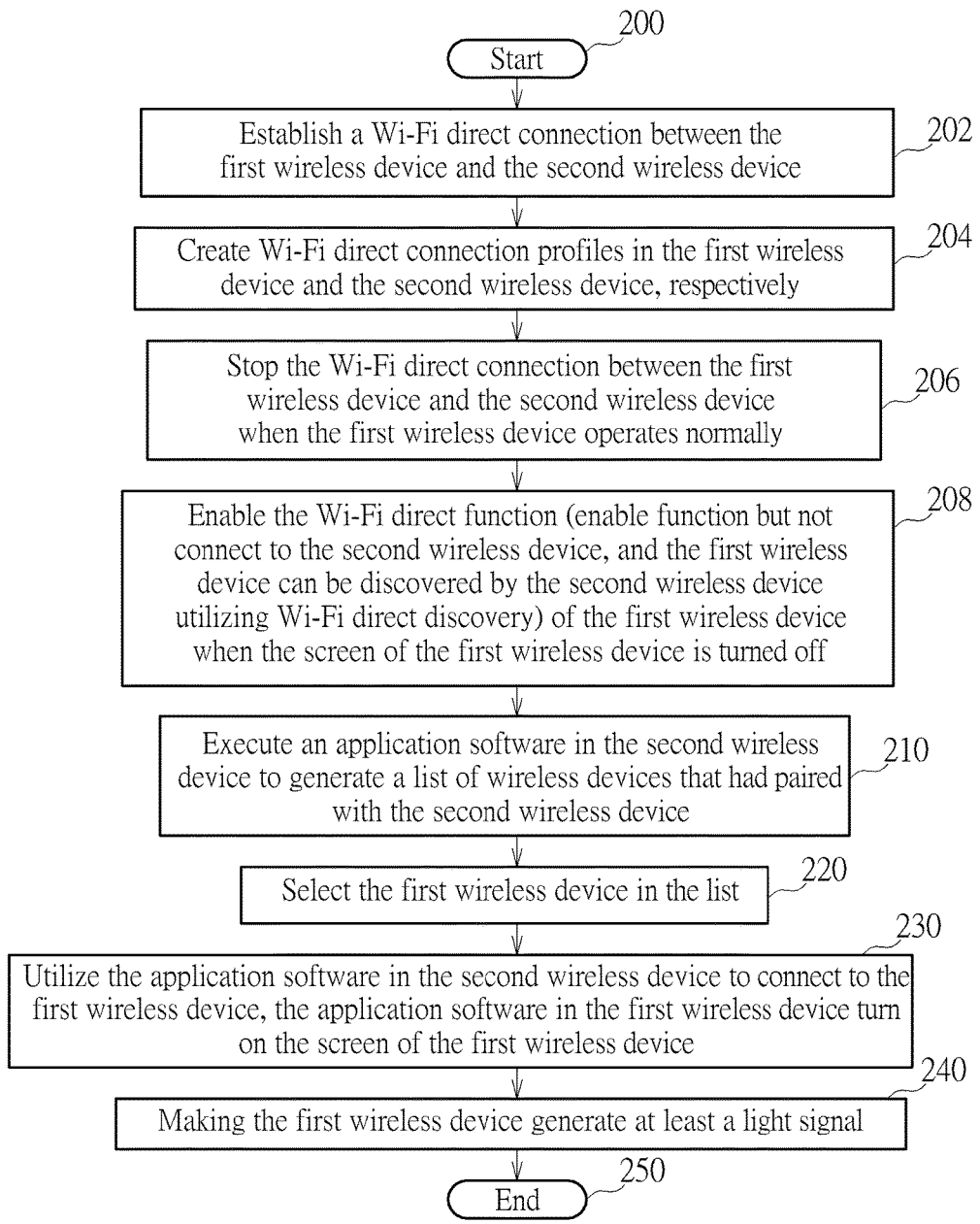
FIG. 2 is a flowchart showing a method for finding a first wireless device by utilizing a Wi-Fi direct connection between the first wireless device and a second wireless device in accordance with a second exemplary embodiment of the present invention.

Please refer to FIG. 2. FIG. 2 is a flowchart showing a method for finding a first wireless device by utilizing a Wi-Fi direct connection between the first wireless device and a second wireless device in accordance with a second exemplary embodiment of the present invention, wherein the first wireless device can be a smartphone, a tablet, a laptop, or a handheld computing device, and the second wireless device also can be a smartphone, a tablet, a laptop, or a handheld computing device. Provided that the result is substantially the same, the steps in FIG. 2 are not required to be executed in the exact order shown in FIG. 2. The method of the second exemplary embodiment in the present invention comprises the following steps:

Step 200: Start.

Step 202: Establish a Wi-Fi direct connection between the first wireless device and the second wireless device.

Step 204: Create Wi-Fi direct connection profiles in the first wireless device and the second wireless device, respectively.

Step 206: Stop the Wi-Fi direct connection between the first wireless device and the second wireless device when the first wireless device operates normally.

Step 208: Enable the Wi-Fi direct function (enable function but not connect to the second wireless device, and the first wireless device can be discovered by the second wireless device utilizing Wi-Fi direct discovery) of the first wireless device when the screen of the first wireless device is turned off.

Step 210: Execute an application software in the second wireless device to generate a list of wireless devices that had paired with the second wireless device.

Step 220: Select the first wireless device in the list.

Step 230: Utilize the application software in the second wireless device to connect to the first wireless device, the application software in the first wireless device turn on the screen of the first wireless device.

Step 240: Making the first wireless device generate at least a light signal.

Step 250: End.

(Wi-Fi direct connection needs to be established for the $1^{st}$ time, and the connection can be established manually or trigger by NFC and connect automatically) The Wi-Fi direct connection profiles in the first wireless device and the second wireless device can be automatically created, respectively. Next, in the Step 206, when the first wireless device operates normally (i.e. the first wireless device is not lost by the user), the Wi-Fi direct connection between the first wireless device and the second wireless device can be automatically stopped. Next, in the Step 208, when the screen of the first wireless device is turned off (i.e. the first wireless device is in a power saving mode, a sleep mode, or lost by the user) the Wi-Fi direct function in the first wireless device wireless can be automatically enabled. Next, in the Step 210, when the user can not find the first wireless device or the first wireless device is lost, the user can execute an application software in the second wireless device (such as a windows application program in a PC or a laptop, or an APP program in a smartphone or a tablet, etc.) to generate a list of wireless devices that had paired with the second wireless device. Next, in the Step 220, the user can select the first wireless device in the list by using the second wireless device. Next, in the Step 220, the user can utilize the application software in the second wireless device (such as a windows application program in a PC or a laptop, or an APP program in a smartphone or a tablet, etc.) to connect to the first wireless device and then the application software in the $1^{st}$ device turn on the screen of the first wireless device. Next, in the Step 240, the user can make the first wireless device generate at least a light signal; for example, the user can utilize the application software in the second wireless device to connect to the first wireless device to make the first wireless device constantly light or discontinuously sparkle. In this way, the method disclosed by the present invention can help the user to find the first wireless device by utilizing the Wi-Fi direct connection between the first wireless device and the second wireless device without using any additional hardware even when the first wireless device is in the mute mode or the vibration mode.

Please note that the above embodiment is only for an illustrative purpose and is not meant to be a limitation of the present invention. For example, the step of enabling the Wi-Fi direct function of the first wireless device when a screen of the first wireless device is turned off can further comprise: switching the first wireless device to a mute mode or a vibration mode. In addition, in the Step 230, a user also can utilize the application software in the second wireless device to connect to the first wireless device to turn on a speaker of the first wireless device.

Figure 3:
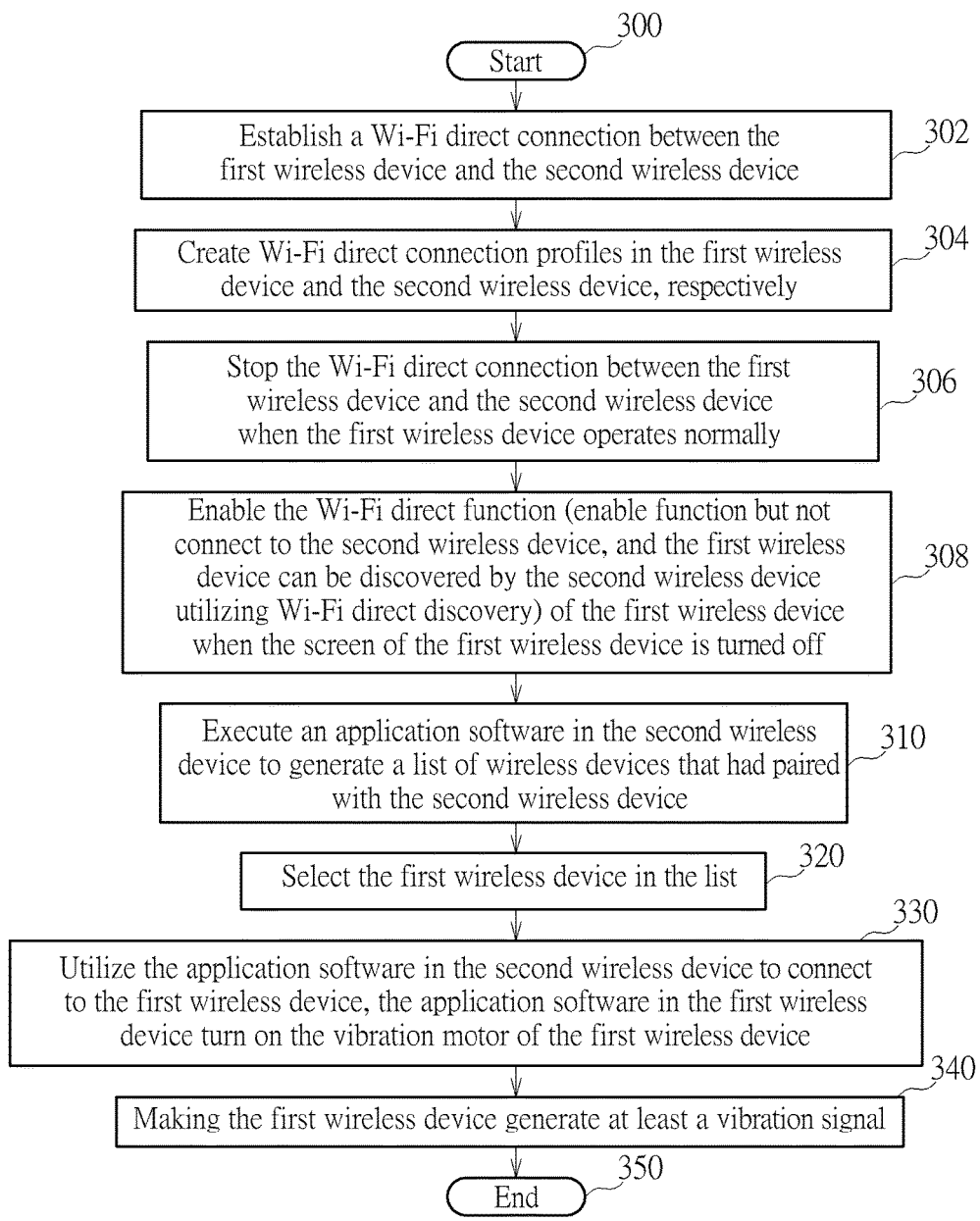
FIG. 3 is a flowchart showing a method for finding a first wireless device by utilizing a Wi-Fi direct connection between the first wireless device and a second wireless device in accordance with a third exemplary embodiment of the present invention.

Please refer to FIG. 3. FIG. 3 is a flowchart showing a method for finding a first wireless device by utilizing a Wi-Fi direct connection between the first wireless device and a second wireless device in accordance with a third exemplary embodiment of the present invention, wherein the first wireless device can be a smartphone, a tablet, a laptop, or a handheld computing device, and the second wireless device also can be a smartphone, a tablet, a laptop, or a handheld computing device. Provided that the result is substantially the same, the steps in FIG. 3 are not required to be executed in the exact order shown in FIG. 3. The method of the third exemplary embodiment in the present invention comprises the following steps:

Step 300: Start.

Step 302: Establish a Wi-Fi direct connection between the first wireless device and the second wireless device.

Step 304: Create Wi-Fi direct connection profiles in the first wireless device and the second wireless device, respectively.

Step 306: Stop the Wi-Fi direct connection between the first wireless device and the second wireless device when the first wireless device operates normally.

Step 308: Enable the Wi-Fi direct function (enable function but not connect to the second wireless device, and the first wireless device can be discovered by the second wireless device utilizing Wi-Fi direct discovery) of the first wireless device when the screen of the first wireless device is turned off.

Step 310: Execute an application software in the second wireless device to generate a list of wireless devices that had paired with the second wireless device.

Step 320: Select the first wireless device in the list.

Step 330: Utilize the application software in the second wireless device to connect to the first wireless device, the application software in the first wireless device turn on the vibration motor of the first wireless device.

Step 340: Making the first wireless device generate at least a vibration signal.

Step 350: End.

(Wi-Fi direct connection needs to be established for the 1$^{st}$ time, and the connection can be established manually or trigger by NFC and connect automatically) The Wi-Fi direct connection profiles in the first wireless device and the second wireless device can be automatically created, respectively. Next, in the Step 306, when the first wireless device operates normally (i.e. the first wireless device is not lost by the user), the Wi-Fi direct connection between the first wireless device and the second wireless device can be automatically stopped. Next, in the Step 308, when the screen of the first wireless device is turned off (i.e. the first wireless device is in a power saving mode, a sleep mode, or lost by the user) the Wi-Fi direct function in the first wireless device wireless can be automatically enabled. Next, in the Step 330, when the user can not find the first wireless device or the first wireless device is lost, the user can execute an application software in the second wireless device (such as a windows application program in a PC or a laptop, or an APP program in a smartphone or a tablet, etc.) to generate a list of wireless devices that had paired with the second wireless device. Next, in the Step 320, the user can select the first wireless device in the list by using the second wireless device. Next, in the Step 330, the user can utilize the application software in the second wireless device (such as a windows application program in a PC or a laptop, or an APP program in a smartphone or a tablet, etc.) to connect to the first wireless device and then the application software in the 1$^{st}$ device turn on a vibration motor of the first wireless device. Next, in the Step 340, the user can make the first wireless device generate at least a vibration signal. For example, the user can utilize the application software in the second wireless device to connect to the first wireless device to make the first wireless device generate all kinds of vibrations constantly or discontinuously. Or, if the first wireless device is a smartphone, and then the user can make a phone call to the first wireless device to make the first wireless device generate all kinds of vibrations constantly or discontinuously. In this way, the method disclosed by the present invention can help the user to find the first wireless device by utilizing the Wi-Fi direct connection between the first wireless device and the second wireless device without using any additional hardware even when the first wireless device is in the mute mode.

Please note that the above embodiment is only for an illustrative purpose and is not meant to be a limitation of the present invention. For example, the step of enabling the Wi-Fi direct function of the first wireless device when the screen of the first wireless device is turned off can further comprise: switching the first wireless device to a mute mode. In addition, in the Step 320, a user also can utilize the application software in the second wireless device to connect to the first wireless device to turn on the speaker or/and the screen of the first wireless device. In the Step 330, the user can utilize the application software in the second wireless device to connect to the first wireless device to make the first wireless device generate at least an audio signal (such as a sound, a song, or music) or/and make the first wireless device constantly light or discontinuously sparkle.

Briefly summarized, the method disclosed by the present invention can help a user to find the first wireless device by utilizing a Wi-Fi direct connection between the first wireless device and a second wireless device without using any additional hardware even when the first wireless device is in a mute mode or a vibration mode, and thus the present invention can reduce hardware cost. In addition, the method disclosed by the present invention can be applied to a bi-directional operation. For example, the present invention can use a laptop to find a smartphone, and also can use the smartphone to find the laptop.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for finding a wireless device by utilizing a Wi-Fi direct connection, comprising:
   storing a Wi-Fi direct connection profile between the wireless device and an electronic device in the wireless device and the electronic device;
   enabling a Wi-Fi direct connection function of the wireless device according to the wireless connection profile when a condition is met; and
   establishing the Wi-Fi direct connection with the wireless device by the electronic device to control the wireless device,
   wherein the wireless device is found by utilizing the Wi-Fi direct connection between the wireless device and the electronic device without using any additional hardware;
   wherein the step of storing the Wi-Fi direct connection profile between the wireless device and the electronic device comprises,
   creating Wi-Fi direct connection profiles in the wireless device and the electronic device, respectively; and
   stopping the Wi-Fi direct connection between the wireless device and the electronic device when the wireless device operates normally.

2. The method of claim 1, wherein the condition is, when a screen of the wireless device is turned off or when a speaker of the wireless device is turned off.

3. The method of claim 1, wherein the step of establishing a Wi-Fi direct connection with the wireless device by the electronic device comprises,
   generating a list of paired wireless devices in the electronic device; and
   selecting the wireless device from the list on the electronic device.

4. The method of claim 1, wherein the step of enabling the Wi-Fi direct connection function of the wireless device when a condition is met comprises:
   switching the wireless device to a mute mode or a vibration mode.

5. The method of claim 1, wherein the step of establishing the Wi-Fi direct connection with the wireless device by the electronic device comprises:
   turning on a speaker of the wireless device.

6. The method of claim 5, further comprising:
   generating at least an audio signal by the wireless device.

7. The method of claim 1, wherein the step of establishing the Wi-Fi direct connection with the wireless device by the electronic device comprises:
   turning on the screen of the wireless device.

8. The method of claim 7, further comprising:
   generating a light signal by the wireless device.

9. The method of claim 1, wherein the step of establishing the Wi-Fi direct connection with the wireless device by the electronic device comprises:
   turning on a vibration motor of the wireless device.

10. The method of claim 9, further comprising:
    generating a vibration signal by the wireless device.

11. The method of claim 1, wherein the wireless device is a smartphone, a tablet, a laptop, or a handheld computing device.

12. The method of claim 1, wherein the electronic device is a smartphone, a tablet, a laptop, or a handheld computing device.

13. The method of claim 1, wherein the step of storing the Wi-Fi direct connection profile between the wireless device and the electronic device comprises,
    triggering by a near field connection (NFC) device at the wireless device and the electronic device.

* * * * *